US008577871B2

(12) United States Patent
Dageville et al.

(10) Patent No.: US 8,577,871 B2
(45) Date of Patent: Nov. 5, 2013

(54) METHOD AND MECHANISM FOR OUT-OF-THE-BOX REAL-TIME SQL MONITORING

(75) Inventors: Benoit Dageville, Foster City, CA (US); Venkateshwaran Venkataramani, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 485 days.

(21) Appl. No.: 12/060,117

(22) Filed: Mar. 31, 2008

(65) Prior Publication Data
US 2009/0248621 A1    Oct. 1, 2009

(51) Int. Cl.
*G06F 17/00*    (2006.01)

(52) U.S. Cl.
USPC ............................................. 707/719

(58) Field of Classification Search
USPC ............................................. 707/719
See application file for complete search history.

(56) References Cited

U.S. PATENT DOCUMENTS

| 6,026,391 | A * | 2/2000 | Osborn et al. ........................ 1/1 |
| 6,374,232 | B1 | 4/2002 | Dageville et al. |
| 6,609,131 | B1 | 8/2003 | Zait et al. |
| 6,665,684 | B2 | 12/2003 | Zait et al. |
| 6,931,390 | B1 | 8/2005 | Zait et al. |
| 6,957,225 | B1 | 10/2005 | Zait et al. |
| 6,965,891 | B1 | 11/2005 | Jakobsson et al. |
| 7,020,661 | B1 | 3/2006 | Cruanes et al. |
| 7,321,888 | B2 * | 1/2008 | Day et al. ....................... 707/722 |
| 7,877,381 | B2 * | 1/2011 | Ewen et al. .................... 707/719 |
| 2003/0065648 | A1 * | 4/2003 | Driesch et al. .................... 707/2 |
| 2005/0038784 | A1 | 2/2005 | Zait et al. |
| 2005/0097091 | A1 | 5/2005 | Ramacher et al. |
| 2005/0119999 | A1 | 6/2005 | Zait et al. |
| 2005/0120000 | A1 | 6/2005 | Ziauddin et al. |
| 2005/0120001 | A1 | 6/2005 | Yagoub et al. |
| 2005/0125393 | A1 | 6/2005 | Yagoub et al. |
| 2005/0125398 | A1 | 6/2005 | Das et al. |
| 2005/0125427 | A1 | 6/2005 | Dageville et al. |
| 2005/0125452 | A1 | 6/2005 | Ziauddin et al. |
| 2005/0132383 | A1 * | 6/2005 | Ghosh et al. .................. 719/312 |
| 2005/0138015 | A1 | 6/2005 | Dageville et al. |
| 2005/0177557 | A1 | 8/2005 | Ziauddin et al. |
| 2006/0167939 | A1 * | 7/2006 | Seidman et al. ........... 707/104.1 |
| 2008/0133454 | A1 * | 6/2008 | Markl et al. ...................... 707/2 |
| 2008/0140622 | A1 * | 6/2008 | Bestgen et al. ................... 707/3 |
| 2008/0140627 | A1 * | 6/2008 | Bossman et al. ................. 707/3 |
| 2009/0024563 | A1 * | 1/2009 | Sengar ............................. 707/2 |

OTHER PUBLICATIONS

IBM "Informix Dynamic Server v10.0 Information Center", http://publib.boulder.ibm.com/infocenter/idshelp/v10/topic.com.ibm, Jan. 7, 2008.
IBM "Informix Dynamic Server (IDS)", http://www-306.ibm.com/software/data/informix/ids, Jan. 7, 2008.

* cited by examiner

*Primary Examiner* — Hung Q Pham
(74) *Attorney, Agent, or Firm* — Vista IP Law Group, LLP (57) ABSTRACT

Methods, systems, and computer program products for monitoring database queries and executions is disclosed. The query syntax may conform to the structured query language (SQL). The approach supports various performance statistics to be monitored at each step of the query statement's execution plan and for each row processed in order to meet requirements of a near real-time query monitoring solution. Such statistics include timing information plus some miscellaneous statistics like the number of rows processed, the amount of memory used, the amount of data spilled to disk, etc.

24 Claims, 8 Drawing Sheets

| SESSION ID | QUERY ID | EXECUTION ID | TIME | OPERATION NUMBER | OPERATION NAME |
|---|---|---|---|---|---|
| 1 | A | 1 | XX:XX:XX | 1 | HJ |
| 1 | A | 1 | XX:XX:XX | 2 | FTS |
| 2 | A | | | | |
| 1 | A | 1 | XX:XX:XX | 3 | FTS |
| 1 | B | | | | |
| 1 | A | 1 | XX:XX:XX | 1 | HJ |

METHOD AND MECHANISM FOR OUT-OF-THE-BOX REAL-TIME SQL MONITORING

BACKGROUND

A database usually includes an interface system that allows a user and/or administrator to access, manage and maintain the database. A common interface used is a database management system (DMS). This interface provides many capabilities such as collecting statistics of the functions of the database.

However, this collection is performed on a global level. The collected information includes only global statistics. A conventional interface observes global level statistics. This mechanism allows viewing statistics only when the execution terminates, not while the statement is running. Also, these statistics are very expensive to collect by default and do not include fine grain timing information such as how much time a plan step spent on CPU or waiting for inputs and outputs (IOs).

SUMMARY

Methods, systems, and computer program products for monitoring database queries and executions are disclosed. The query syntax may conform to the structured query language (SQL). The approach supports various performance statistics to be monitored at each step of the query statement's execution plan and for each row processed in order to meet requirements of a near real-time query monitoring solution. Such statistics include timing information plus some miscellaneous statistics like the number of rows processed, the amount of memory used, the amount of data spilled to disk, etc.

In some embodiments, near real-time monitoring of a query in a database system, includes tracking a plurality of performance metric collected from an execution of the query. Statistics of the performance metrics are storing during the execution of the query. Background processes periodically sample the statistics.

In some embodiments, the query comprises a query syntax conforming to the structured query language (SQL). In some embodiments, the monitoring includes deriving timing information based on the sampled statistics. In some embodiments, the monitoring includes eventually deleting the monitored information. In some embodiments, the performance metrics includes statement elapsed time, CPU time, I/O wait time, and number of reads and writes.

In some embodiments, the monitoring is automatically initiated. In other embodiments, a combination of heuristics and sampling strategies are used to determine the start of the monitoring wherein the heuristics allows for automatically turning on monitoring when the query runs parallel or automatically turning on monitoring when the query has consumed at least five seconds of CPU and/or I/O time in the execution.

In some embodiments, the monitoring includes maintaining plan level timing statistics using a sampling technique. In some embodiments, each process participating in a parallel execution is stored as separate entries in a shared memory. In another embodiment, the skew in the parallel execution is aggregated and statistics of each parallel process in the execution assists in the determination of the statistics of the query.

In some embodiments, the statistics includes timing information and/or cardinality of intermediate results of the execution of the query. In some embodiments, the statistics are inputs to self-tune an execution plan of the query. In some embodiments, the monitoring includes detecting bad estimates and/or bad optimizer costing, determining which intermediate step of the execution is active and/or determining an amount of time it takes to complete each step of the execution and/or the query.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention. The same or similar elements between figures may be referenced using the same reference numbers.

DETAILED DESCRIPTION

Embodiments of the present invention provide methods, systems, and computer program products for monitoring database queries and executions for managing, storing, and accessing unstructured and semi-structured data in relational and object-relational database systems. Any type of query languages and syntaxes are applicable to the embodiments of the present invention. In some embodiments, the query syntax conforms to the structured query language (SQL).

Most requests to the DMS come in the form of SQL statements. Monitoring the execution plan of SQL statements is used for various purposes such as diagnosing performance bottlenecks, evaluating a particular execution plan and more importantly, estimating the time for completion, etc. These results are the only information the DMS has for analyzing the performance of the database query.

Usually, collecting and maintaining the performance statistics at such fine granularity (i.e. for each operator of the execution plan) is prohibitively expensive. Furthermore, since many query statements is executed in a short period of time, maintaining query statistics for each individual execution is resource expensive. Therefore, it is challenging to have a near real-time query monitoring solution enabled by default, out-of-the-box, without compromising performance. For long running SQL statements that are used in various reporting applications and business intelligence data-mining queries, it would be desirable for the monitoring allows for an ability to provide a reasonably accurate time to completion estimate.

Figure 1:
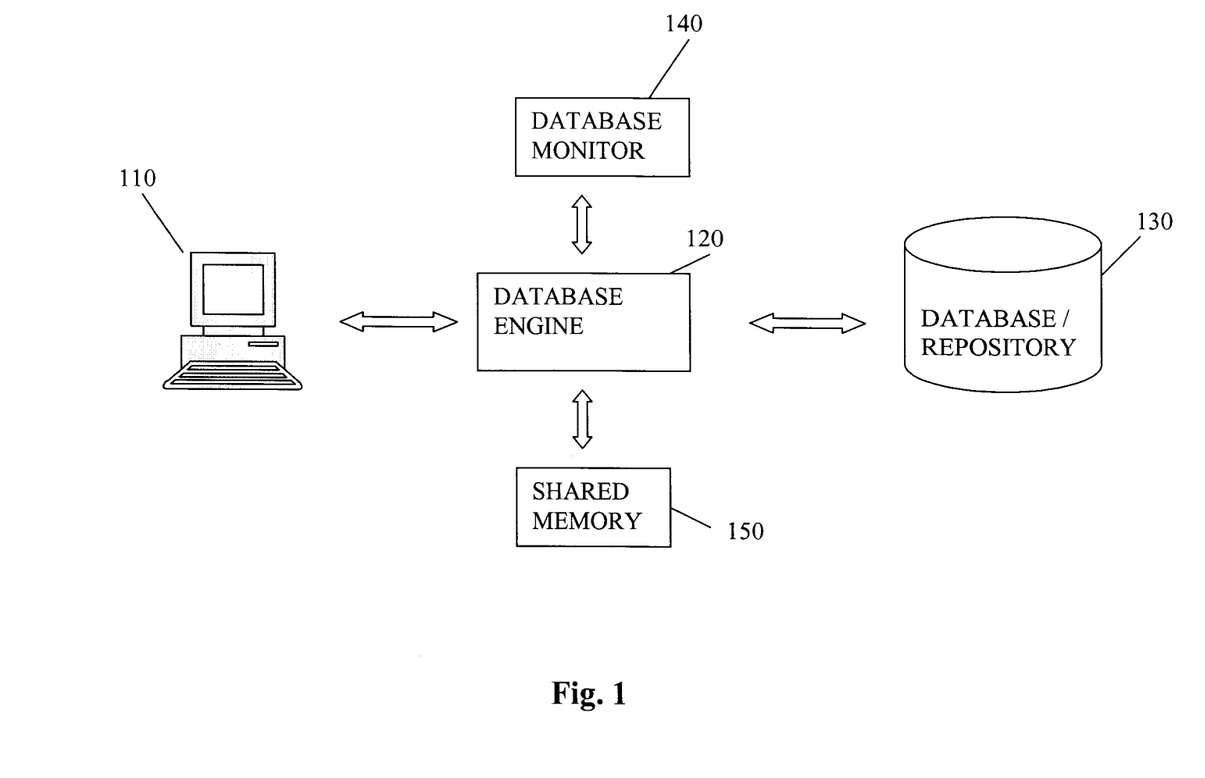
FIG. 1 shows overview architecture according to an embodiment of the invention.

FIG. 1 shows functional overview architecture according to an embodiment of the invention. The embodiment includes a user terminal 110, a database engine 120, a database/repository 130, a monitoring unit 140 and a shared memory 150.

The user terminal 110 provides a user interface with the database/repository 130. In an embodiment, a user may use the terminal 110 to perform query with the database 130. In another embodiment, a database administrator (DBA) may use the terminal to access the performance and other information that have been monitored by the database monitor 140. Any function and/or display that require an interface with an external user and/or system may be provided via the terminal 110.

A database engine 120 creates, retrieves, updates and deletes data from the database 130. For example, the database engine analyzes the query sent by the user terminal and processes it and retrieves the desired data from the database 130. In other embodiments, the database engine may translate the query as need and the retrieved data may be converted to be place in the desired format. The database engine 120 may perform any functions and processes that need to be performed for the query to be understood and for the database to provide the desired data.

A database/repository 130 includes stored information that needs to be accessed by the user. In one embodiment, the database may be a hard drive. In other embodiments, the database may be a server. In further embodiments, the database may include a plurality of hard drives and/or servers, which allows for parallel storage and load balancing of the stored data. In some embodiments, the stored data may be tables. In other embodiments, the stored data may be relational databases. Any database/repository known in the art may be provided with the system.

A monitoring unit 140 monitors the performances of the database engine 120. In one embodiment, various performance statistics is monitored at each step of the query statement's execution plan as well as for each row processed but not returned by the query statement in order to meet requirements of a near real-time query monitoring solution. Such statistics may include timing information (CPU and wait times) plus other statistics such as the number of rows processed, the amount of memory used, the amount of data spilled to disk, etc. In some embodiments, the overhead for this monitoring process is relatively small, for example, less than 1% both in terms of memory and CPU processing resources. In other embodiments, detailed statistics of the query execution are collected, both for the overall execution and for each step of the plan. In some embodiments, these statistics includes timing information as well as cardinality of intermediate results. Because this mechanism works out-of-the-box, in some embodiments, these statistics may be used as input to self-tune the execution plan of query statements. These statistics allows for the detections of bad estimates and/or bad optimizer costing of the query execution. In another embodiment, these statistics are updated near real-time as the statement is executed allowing users such as database administrators (DBAs) to monitor the execution of the query to determine which step of the plan is active and how long it may take to completion.

The shared memory 150 is a memory, cache or a group of memory structure that are accessible by a plurality of components of the database system. This structure allows for increased speed and efficiency for accessing, storing and retrieved the desired information by the database system. In some embodiments, the shared memory is a system global area (SGA). In some embodiments, the SGA is a group of shared memory structures. It may include data and control information. In some embodiments, the data and control information is for an Oracle database instance. In some embodiments, a plurality of database users may be connected to the same instance and the data is shared among the users.

Figure 2:
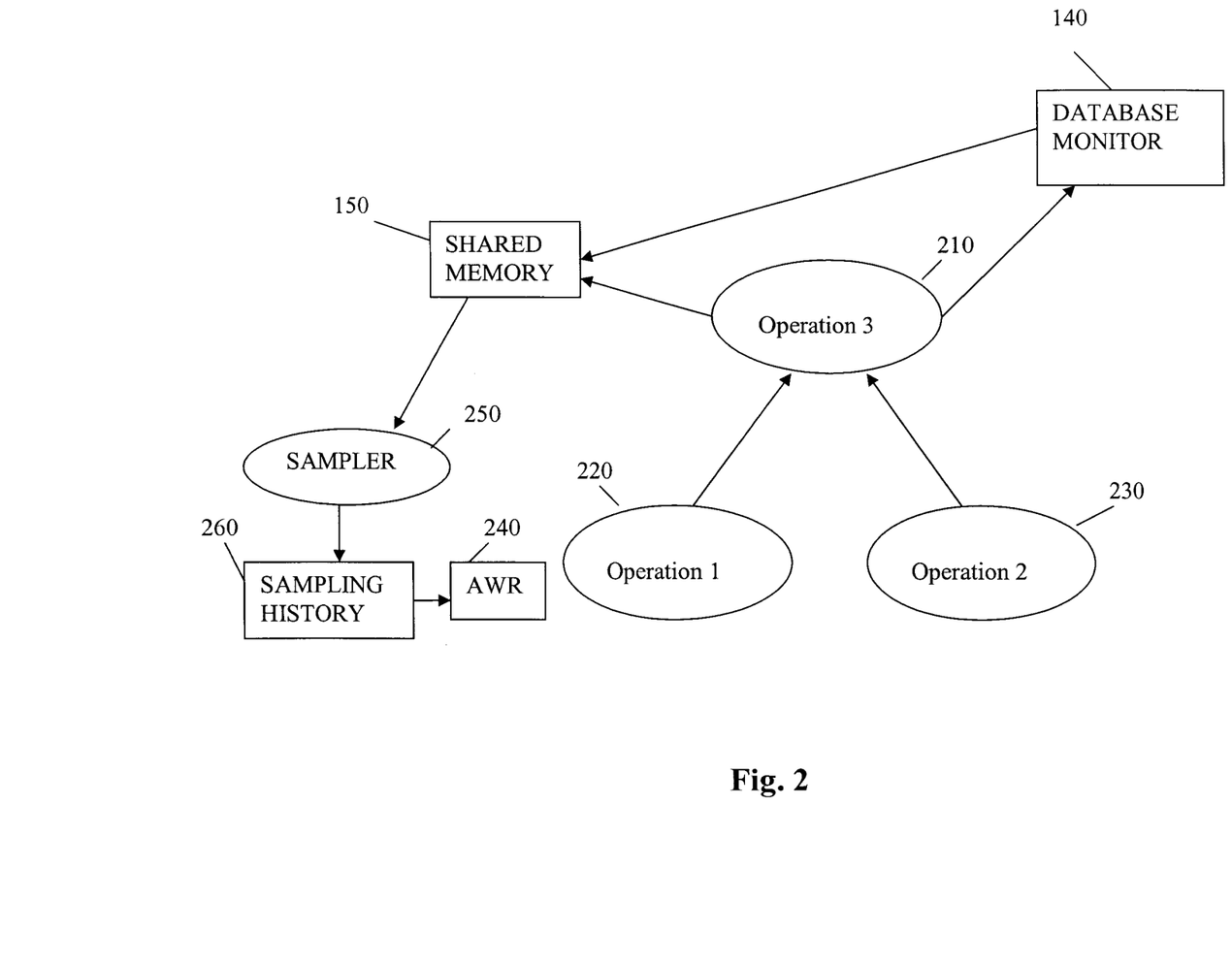
FIG. 2 shows an example architecture and functional relationship for monitoring according to an embodiment of the invention.

FIG. 2 shows an example architecture and functional relationship for monitoring according to an embodiment of the invention. Thus monitoring is provided by default. This monitoring may have variable granularity and may be performed at a global level or at a plan level.

For example, this monitoring allows for obtaining information on which subset of operations is spending the most time. On a global level, one may observe and analyze the query operations with as much detail as desired. For example, at completion of the query, one may obtain information on the amount of time an operation spent on using certain resources such as CPU or I/O. This allows for the user to fix or change certain aspects of the database or query process to improve the efficiency of the query. On a plan level, one may observe the number of operations performed, rows produced, etc.

In an embodiment, a database provides near real-time query monitoring that is automatic (i.e., enabled out of the box), incurs minimal overhead both in terms of CPU and memory, and is fairly accurate. The embodiment includes the monitor 140, the shared memory 150, a sampler 250, performance gathering and reporting tools 240, sampling history table 260, a plan operation 210 with two child operations 220, 230.

The execution plan of a query statement may include a plan operation 210 and two child operations 220, 230. In one embodiment, the operation 210 may be a hash join (HJ). A first child operation may be a full table scan (FTS) of a first table such as a customers table. A second child operation may be also a full table scan (FTS) of a sales table. Such execution plan can be associated to a statement the form of:

```
Select count (*)
from sales, customers
where sales.custid = customers.custid;
and sales.data betweem <date1> and <data2>;
and customers.state = 'CA';
```

In this example, a HJ of the sales table and customers table is performed to find customers leaving in state 'CA' who bought goods between two specific dates. A FTS of each table is performed and the rows are returned and joined using a hash-join algorithm. The operations may result in a varying number of rows and may be partitioned to improve performance.

When the query statement is executed, the monitor 140 may take snapshots of the process at regular interval, for example, every second. The monitor may show the memory consumed. The CPU may include processes of the sampler 250. The monitor 140 looks at the snapshots of the query execution. The time period may be at a set interval. In other embodiment, the time period may be dynamically determined. Thus, a plurality of processing statistics of the execution of the query during the processing is obtained. This information may be viewed as steps of the execution. These steps may be pipelined.

The statistical information may be stored in the share memory 150. In one embodiment, the information is stored in a table. In some embodiments, a snapshot of the execution is taken at a predetermined time interval. When the operation is processing the function of the operator 210 at the snapshot, its process is stored in the table with associated statistics. When the operation is performing the function of the operand 220, that process statistics are stored. For example, an I/O wait or CPU of a FTS is stored is that is what the execution is performing during the snapshot. Over time, a group of execution steps is stored in the table.

The sampler 250 may look at the statistical information and determine the time spent for the processes by looking at the snapshots. By analyzing the frequency of occurrence of steps, performance of the execution may be obtained. For example, if the statistical information of the snapshots shows what the most time is spent (i.e., CPU, I/O, other processes). A detailed analysis is explained in the tables below. The result of the sampler analysis may be stored in a sampling history table 260.

The performance gathering and reporting tools 240 may be used to communicate with the shared memory. It identifies performance problems and provides improvements to the database system. In some embodiments, the tools include an automatic workload repository (AWR).

Figure 3:
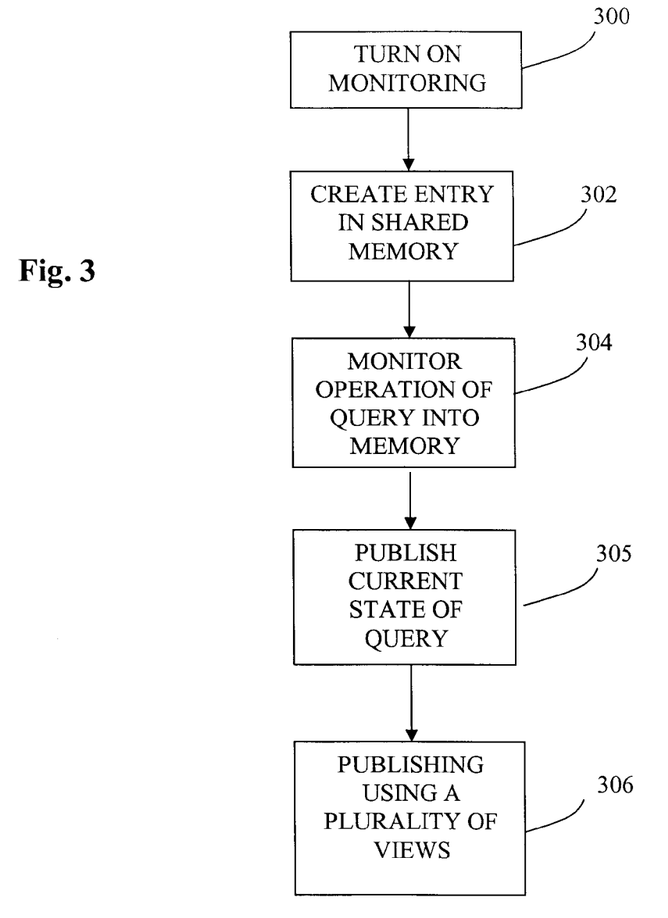
FIG. 3 is a flowchart of a process for monitoring according to an embodiment of the invention.

FIG. 3 is a flowchart of a process for monitoring according to an embodiment of the invention. The monitor 140 may use heuristics to ensure that the performance overhead is minimal (i.e., less than 1%) and memory footprint is small (i.e., less than 1% of available shared memory).

At 300, the monitoring is turned on. The monitoring may be enabled when the system initializes. In one embodiment, heuristics are used to decide if real-time SQL monitoring needs to be turned on or off for a particular SQL execution. Such heuristics are based on few SQL properties such as whether the SQL is running in parallel and a few computationally cheap SQL execution statistics. These statistics includes total CPU or I/O consumed in a single execution. In some embodiments, the heuristic used is to turn real-time SQL monitoring automatically on when a SQL statement runs parallel or when it has consumed at least 5 seconds of CPU or I/O time in a single execution.

In some embodiments, this heuristic is able to perform automatic real-time SQL monitoring for almost all the expensive SQL executions without practically monitoring every single SQL execution. In other embodiments, the heuristic turns on the SQL monitoring logic only for SQL statements that could be an interesting target for real-time monitoring, such as long running SQL.

At 302, an entry is created in the shared memory. In some embodiments, the entry is created in the shared-memory to store some global and plan level execution statistics. The entry may track global performance metrics collected for the execution. In some embodiments, the statistics are monitored and stored at a predetermined period, such as every second. A dynamic monitoring period may be used to monitor based on the length, resource usage, the data requested, system congestion, etc. by the query execution.

At 304, the operations of the query may be monitored. In some embodiments, the operations performed are monitored in the background without directly using the resources of the database system. Since a separate background process performs the monitoring, the implementation imposes negligible overhead and minimal changes upon the actual query execution logic.

At 305, the current state of the query is published. In some embodiments, the state includes information such as the time spent on certain processes and/or the number of rows produced. This information about the operations of the query is pushed into memory. The information is published which represent the state of the query at the time of the publication. In one embodiment, the information of execution may be pushed every second. In another embodiment, the information includes I/O information and/or the rows consumed by the query. In another embodiment, the total time spent may be recorded. The information may be updated and/or refreshed at a predetermined interval such as every second. In another embodiment, the snapshots may be replayed as a time lapse movie of query executions.

At 306, the monitored operations may be published using a plurality of views. In some embodiments, parallel queries, data manipulation language (DML) and data definition language (DDL) statements are automatically monitored as soon as execution starts. Monitoring information for each process participating in the parallel execution is recorded as separate entries in shared memory. This monitoring strategy allows for identifying skew in the parallel execution. In other embodiments, monitoring statistics for each parallel process participating in the execution can be aggregated to determine the statistics for the overall statement at the same time. In other embodiments, several views maintain monitoring statistics on behalf of a SQL statement execution. For example, these views may include query monitor (i.e., V$SQL_MONITOR) and query plan monitor (i.e., V$SQL_PLAN_MONITOR).

Figure 4:
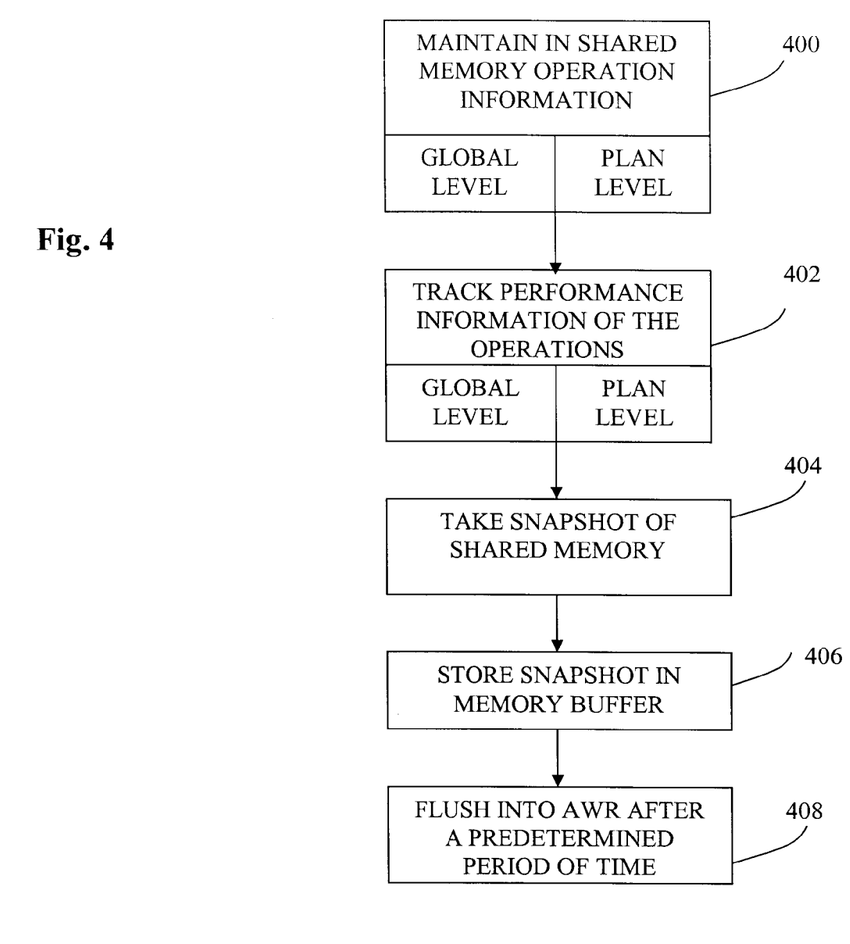
FIG. 4 is a flowchart of a process for storing entries according to an embodiment of the invention.

FIG. 4 is a flowchart of a process for storing entries according to an embodiment of the invention. This may be performed by the sampler 250 and produces the sampling history 260.

In some embodiments, once a particular query execution becomes eligible for real-time query monitoring, it creates an entry in shared-memory to maintain some global and plan level execution statistics for operations in shared memory 400. From that point on, this entry tracks global and plan level performance information collected for the execution of the operations of the query 402. In some embodiments, the information collected includes statement elapsed time, CPU time, number of reads and writes, I/O wait time and various other wait times. In other embodiments, the operations are maintained and the amount of time is recorded. This may reflect long running operations as well as if an operation is stuck at a certain execution process. This may also reflect what resources are waiting due to contention or locking in the execution.

A snapshot of the shared memory is taken in near real-time as the statement executes 404. In some embodiments, the statistics are saved in a predetermined time period generally once every second. Any time period may be chosen as desired depending on the database system. In other embodiments, a dynamic time period may be used.

The snapshot is stored in a memory buffer at 406. Monitoring information is not deleted immediately, but is kept in the memory buffer for another period of time. The memory buffer may be a circular memory. In some embodiments, this period may be at least one minute. Any time period may be used and the size of the memory buffer may be varied.

The entry will eventually be deleted so its space can be reclaimed 408, as new statements are monitored. The removed entries may be stored in the performance gathering and reporting tools 240. Any information from the memory buffer may be transferred to the tools 240 at any desired time interval.

Figure 5:
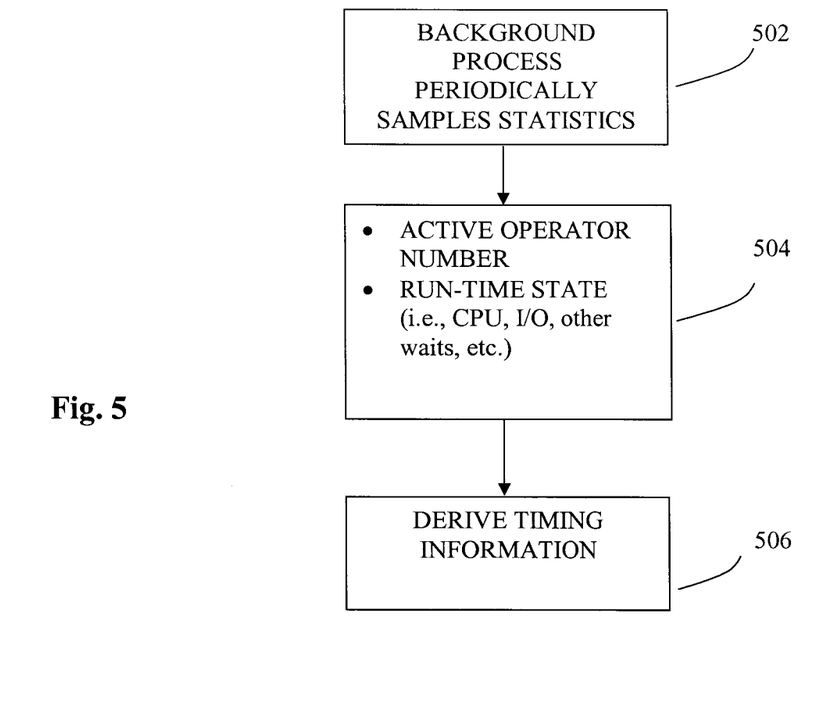
FIG. 5 is a flowchart of a process for maintaining statistics according to an embodiment of the invention.

FIG. 5 is a flowchart of a process for maintaining statistics 402 according to an embodiment of the invention.

At 502, separate background process periodically samples the performance statistics. In some embodiments, the background process performs the sampling to obtain the performance of the database. To keep the monitoring overhead at a minimum, plan level timing statistics are maintained using sampling technique.

At 504, a set of performance statistics is identified. In some embodiments, these statistics are obtained at the time of the snapshot of the process. Any known process may be utilized to obtain performance statistics. In some embodiments, timing information for each row process by each step of the execution plan is obtained. In some embodiments, the active step number of the plan is maintained near real-time in shared memory. In other embodiments, the background process periodically samples the query execution to identify the active step number. In some embodiments, the step number is sampled along with various statistics about the runtime state of the execution (i.e. CPU, I/O or other wait). In some embodiments, the process is sampled once every second. Any period may be used as desired.

At 506, the timing information of the query process may be derived based on the step number and the nature of the samples collected on behalf of each step of the execution plan. The timing information may be obtained by retrieving it from the snapshot.

Figure 6:
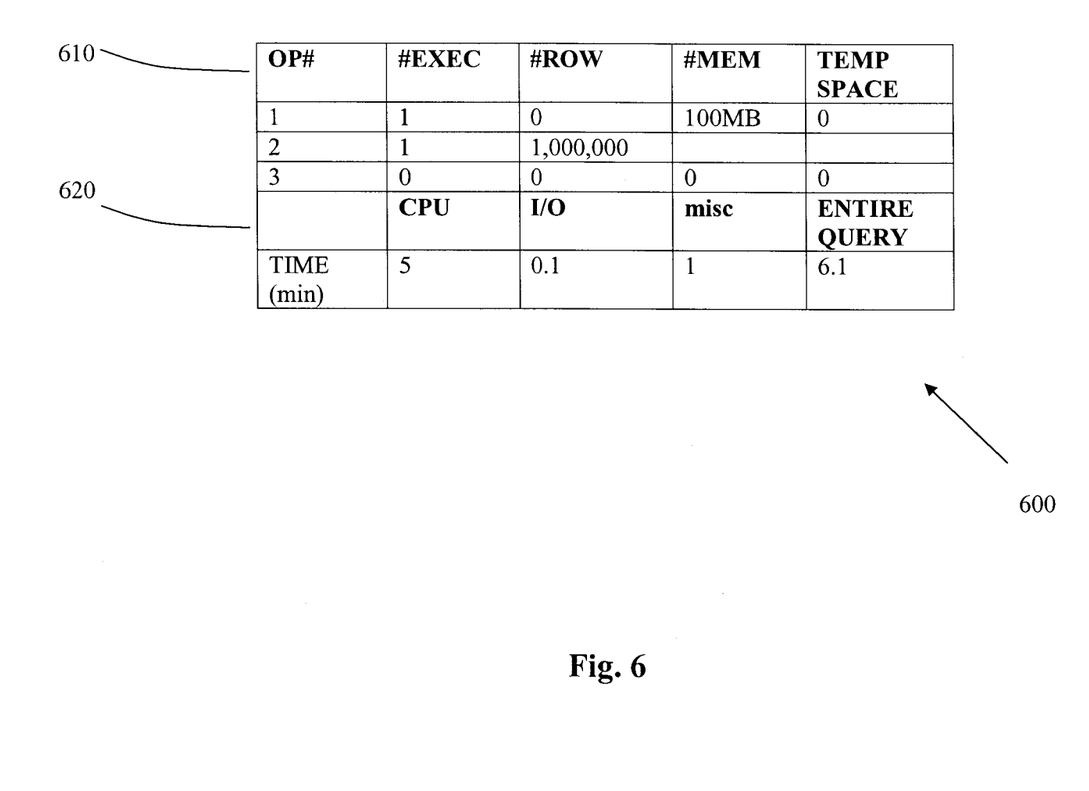
FIG. 6 shows an example Monitor_Table according to an embodiment of the invention.

FIG. 6 shows an example Monitor_Table according to an embodiment of the invention. The table may be refreshed in real time. It includes plan level information as well as global level information.

The table 600 represents an example of a table of information that the database monitor may store as monitor information. For example, the table will store plan level information.

In one embodiment, the plan level information 610 includes a plurality of operation number. Each operation has its own row with columns for the operation number, number of execution, number of rows, amount of memory used and the amount of temporary memory space it is occupying at the moment. For example, an operation number 1 performed 1 execution that is not including any rows, but it is using 100 MB of memory and 1M of temporary memory space. For example, the operation number 2 performs 1 execution where a million rows are produced. At operation number 3 has not been performing any operations. This monitor table may be stored and provided for any components that require this type of monitored information.

In another embodiment, the table includes global level information 620. Global level information includes the amount of time and the kinds of functions the query performed during the execution of the plan. In some embodiments, the table maintains the amount of time spent and the resources used by the query. For example, the table 620 shows that the entire query took 6.1 minutes and 5 minutes for the CPU, 0.1 minute was for I/O waiting, and other resources were used in the other 1 minute. Any resources used by the query execution may be monitored and included in this table.

Figure 7:
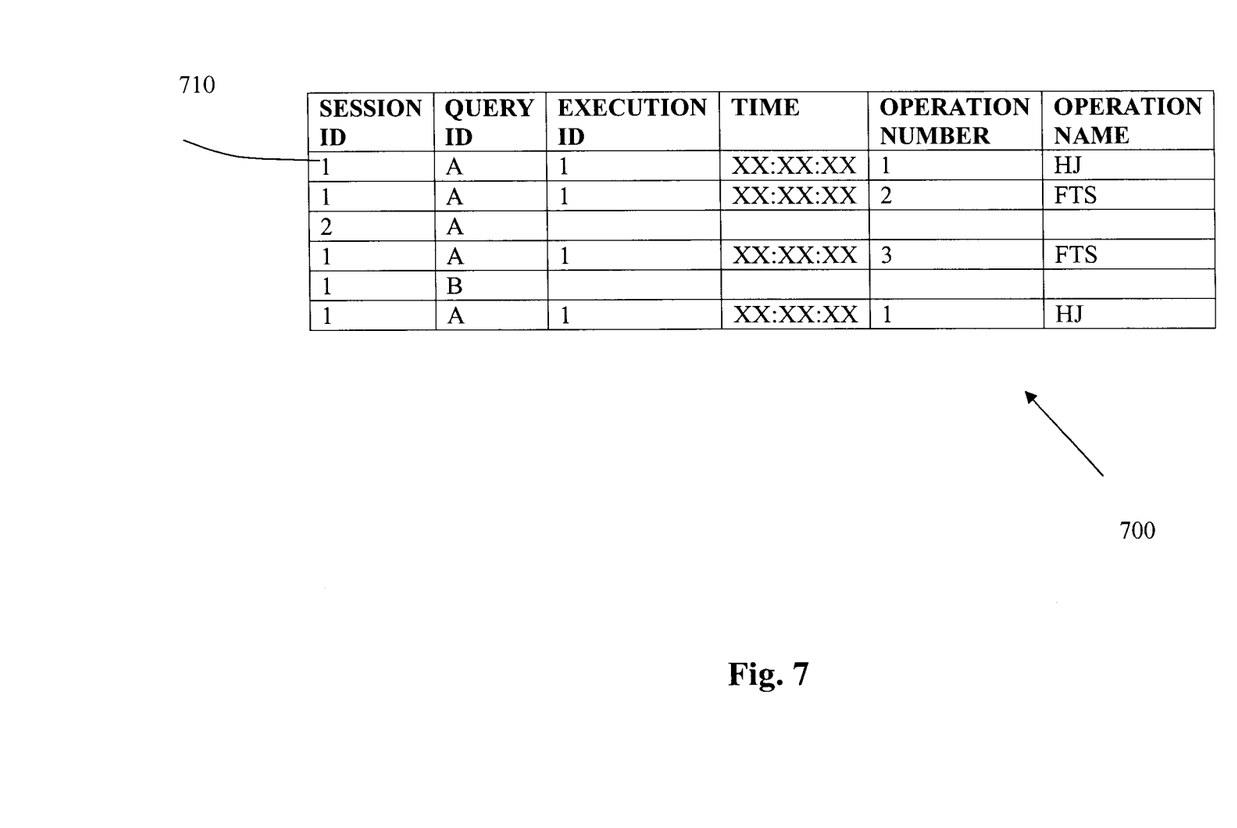
FIG. 7 shows an example Sampling_History_Table according to an embodiment of the invention.

FIG. 7 shows an example Sampling_History_Table 700 according to an embodiment of the invention. This table includes the sampling history 260 and stores the information that the sampler 250. In one embodiment, this table provides information 710 that uniquely for the execution of operations by includes session identification (session ID), query identification (query ID) and execution identification (exec ID). For each execution of the plan, the table also provides information for the time, the operation being executed and the name of the operation. For example, 710 shows exec id 1 shows that the execution named 1 is being performed by the plan, a time of the execution is stored and its function such as operation 1, named HJ, is being performed. If the snapshot occurs during the execution of the full table scan, then the second row with 2 and FTS is stored. When other sessions are identified during the snapshots then the information is stored in this table. Information about operations from other session is included in this table as they are also sampled in the database system. For example, index scan from session 2 may be listed in this table. If the sampling occurs when session 2 is performing its query A operation 20, the information for the index scan is recorded in this table. Information from other queries is also included in the sampling table. For example, query B may be sampled when it is performing operation 5 which may be nested loop join.

As a result, the kinds of operations and the amount of problems for the database may be determined by analyzing this table. For example, if the sampling table shows a disproportionate amount of an operation, then that may be a problem and a user may want to cancel that execution. Any problems that the table may represent may be used for the DBA to monitor the database. The DBA may then take appropriate actions to alleviate the bottleneck or other problems identified by the sampling table.

In some embodiments, the timing table may include samples of operations that are relatively fast (i.e., took a small amount of execution time). In those cases, each execution may only be captured by the snapshot once. The operation from different session and/or query may be analyzed together to determine if that operation is an expensive operation.

The tables of FIG. 6 and FIG. 7 may be analyzed together to obtain additional information of the query. Using the monitoring information from FIG. 6 and sampling information of FIG. 7, many different analyses may be performed to obtain any desirable information.

In one embodiment, timing information is derived at the execution plan level. The sampling may be determined as a percentage of a time. For example, the CPU time for an operation may be determined to be 5 minutes as stated by the table. The sampling table may include, for about half of the execution 1 entries, hash join and, for about a quarter of execution 1, each one of the full table scan. This information may also be obtained by looking at the sampling table. The operation may be correlated to be spending about 50% of the time performing hash join and about 25% of the time performing each full table scans. In this example, the amount of time for an operation may be derived by looking at the total time of CPU usage for hash join and multiplying it by the percentage of total sampling for the occurrences of operation hash join. In this example, 5 minutes multiply with 50% equals 2 minutes 30 second. Therefore, the hash join operation takes approximately 2.5 minutes in this execution plan. Thus, by analyzing the sampling information and monitoring information, the timing information for an operation may be derived.

System Architecture Overview

Figure 8:
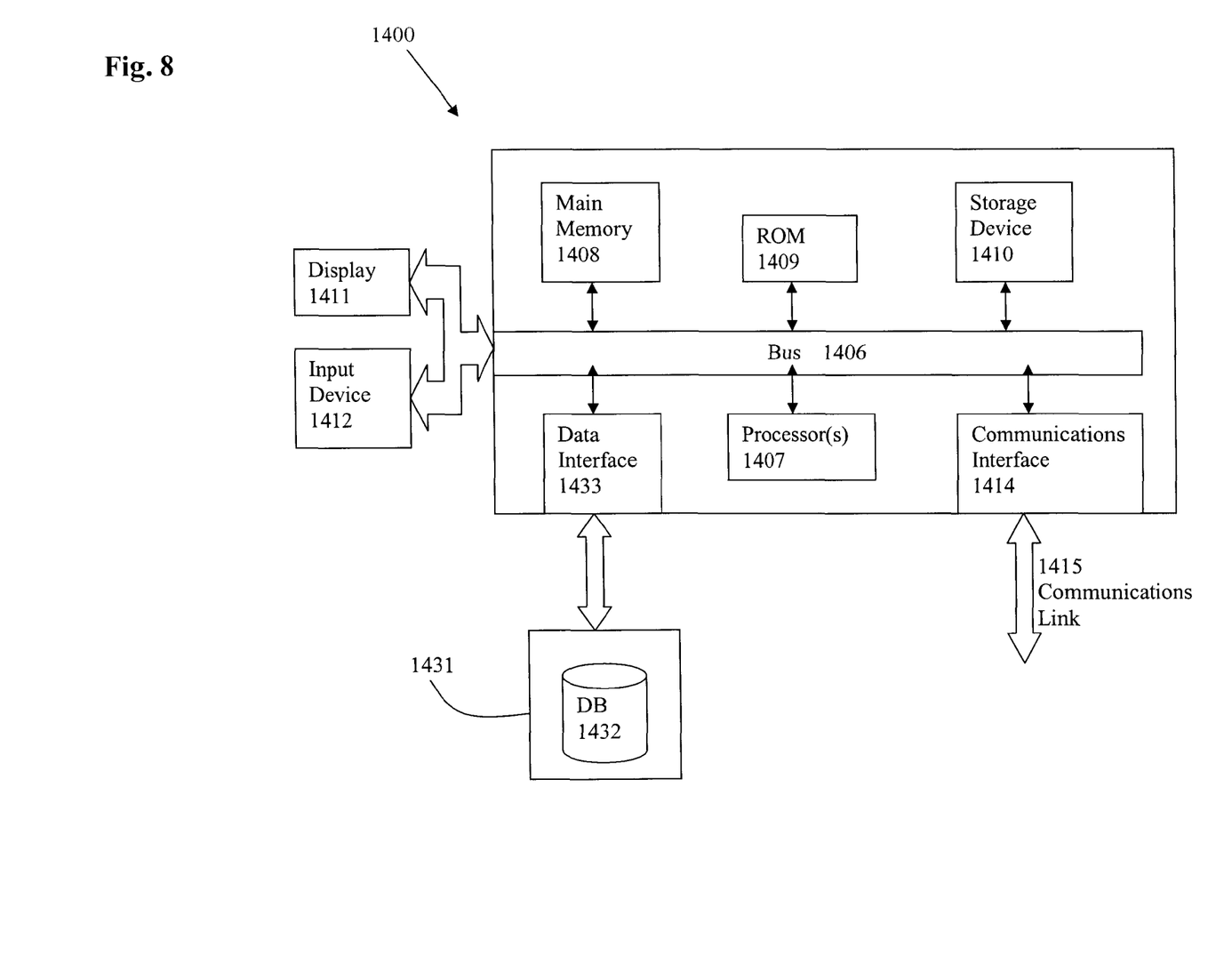
FIG. 8 is a diagram of a computer system with which the present invention can be implemented.

The execution of the sequences of instructions required to practice the invention may be performed in embodiments of the invention by a computer system 1400 as shown in FIG. 8. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 8, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to non-volatile and volatile media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for near real-time monitoring of a query in a database system, comprising:
   determining whether or not to monitor an execution of the query;
   in response to determination that the execution of the query is to be monitored, periodically collecting, by using a computer system comprising a processor, a plurality of statistics from the execution of the query;
   storing the plurality of periodically collected statistics during the execution of the query;
   periodically gathering performance statistics from the plurality of stored statistics using background processes for analysis during the execution of the query;
   storing the periodically gathered performance statistics in a volatile or non-volatile computer-useable medium;
   estimating a time to completion for the query by analyzing the stored performance statistics.

2. The method of claim 1, wherein the query comprises a query syntax conforming to structured query language (SQL).

3. The method of claim 1, further comprises deriving timing information at an execution plan level based at least in part upon the gathered performance statistics.

4. The method of claim 1, further comprising deleting the stored performance statistics.

5. The method of claim 1, wherein the stored performance statistics comprise performance metrics includes statement elapsed time, CPU time, I/O wait time, and number of reads and writes.

6. The method of claim 1, wherein the near real-time monitoring is automatically initiated.

7. The method of claim 1, wherein a combination of heuristics and sampling are used to determine the start of near real-time monitoring.

8. The method of claim 7, wherein the heuristics comprises automatically turning on monitoring when the query runs parallel to one or more other queries in the execution.

9. The method of claim 7, wherein the heuristics comprises automatically turning on monitoring when the query has consumed at least five seconds of CPU and/or I/O time in the execution.

10. The method of claim 1, further comprises maintaining plan level timing statistics using a sampling technique.

11. The method of claim 1, further comprising storing a process participating in a parallel execution as separate entries in a shared memory.

12. The method of claim 11, further comprising:
aggregating one or more skews in the parallel execution; and
assisting in determination of the performance statistics of the query by using gathered statistics of the process in the parallel execution of the query.

13. The method of claim 1, wherein the gathered statistics comprises timing information.

14. The method of claim 1, wherein the gathered statistics comprises cardinality of intermediate results of the execution of the query.

15. The method of claim 1, wherein the gathered performance statistics are inputs to self-tune an execution plan of the query before the execution of the query is finished.

16. The method of claim 15, further comprising detecting bad estimates and/or bad optimizer costing.

17. The method of claim 1, further comprising determining which intermediate step of the execution is active.

18. The method of claim 1, further comprises determining an amount of time it takes to complete each step of the execution and/or the query.

19. A computer program product comprising a computer useable medium having executable code to execute a process by a processor for monitoring a query in a database system, the process comprising:
determining whether or not to monitor an execution of the query;
in response to determination that the execution of the query is to be monitored, periodically collecting, plurality of statistics from the execution of the query;
storing the plurality of periodically collected statistics during the execution of the query;
periodically gathering performance statistics from the plurality of stored statistics using background processes for analysis during the execution of the query;
storing the periodically gathered performance statistics in a volatile or non-volatile computer-useable medium;
estimating a time to completion for the query by analyzing the stored performance statistics.

20. The computer program product of claim 19, wherein the query comprises a query syntax conforming to structured query language (SQL).

21. The computer program product of claim 19, wherein the gathered performance statistics are inputs to self-tune an execution plan of the query before the execution of the query is finished.

22. A system for monitoring a query in a database system, comprising:
a processor;
a memory for holding programmable code; and
wherein the programmable code includes instructions executable by the processor for:
determining whether or not to monitor an execution of the query;
in response to determination that the execution of the query is to be monitored, periodically collecting, a plurality of statistics from the execution of the query;
storing the plurality of periodically collected statistics during the execution of the query;
periodically gathering performance statistics from the plurality of stored statistics using background processes for analysis during the execution of the query;
storing the periodically gathered performance statistics in a volatile or non-volatile computer-useable medium;
estimating a time to completion for the query by analyzing the stored performance statistics.

23. The system of claim 22, wherein the query comprises a query syntax conforming to structured query language (SQL).

24. The system of claim 22, wherein the gathered performance statistics are inputs to self-tune an execution plan of the query before the execution of the query is finished.

* * * * *